(12) United States Patent
Belleschi et al.

(10) Patent No.: US 9,294,975 B2
(45) Date of Patent: Mar. 22, 2016

(54) SELECTION OF A RADIO CELL SECTOR

(71) Applicant: Telefonaktiebolaget L M Ericsson (publ), Stockholm (SE)

(72) Inventors: Marco Belleschi, Solna (SE); Hongwei Wang, Solna (SE); Christian Skärby, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 11 days.

(21) Appl. No.: 14/334,980

(22) Filed: Jul. 18, 2014

(65) Prior Publication Data
US 2015/0030004 A1 Jan. 29, 2015

(30) Foreign Application Priority Data
Jul. 26, 2013 (EP) .................................... 13178208

(51) Int. Cl.
| | |
|---|---|
| *H04W 4/00* | (2009.01) |
| *H04W 36/04* | (2009.01) |
| *H04B 17/382* | (2015.01) |
| *H04W 36/30* | (2009.01) |
| *H04L 5/00* | (2006.01) |
| *H04B 17/318* | (2015.01) |

(52) U.S. Cl.
CPC .............. *H04W 36/04* (2013.01); *H04B 17/382* (2015.01); *H04W 36/30* (2013.01); *H04B 17/318* (2015.01); *H04L 5/001* (2013.01)

(58) Field of Classification Search
CPC ............ H04W 36/00; H04W 36/0005; H04W 36/0016; H04W 36/0083; H04W 36/04; H04W 36/08; H04W 36/16; H04W 36/30; H04B 17/382
See application file for complete search history.

(56) References Cited

U.S. PATENT DOCUMENTS

| | | | | |
|---|---|---|---|---|
| 8,515,425 | B2 * | 8/2013 | Rao ........................ | H04W 36/06 370/331 |
| 2009/0323637 | A1 * | 12/2009 | Kashiwase ............ | H04W 52/42 370/331 |
| 2014/0105040 | A1 * | 4/2014 | Baker ................. | H04W 52/367 370/252 |

FOREIGN PATENT DOCUMENTS

EP    2 566 246 A2    3/2013

OTHER PUBLICATIONS

3GPP, Technical Specification, "3rd Generation Partnership Project; Technical Specification Group Services and System Aspects; Vocabulary for 3GPP Specifications (Release 12)", 3GPP TR 21.905 V12.0.0 (Jun. 2013), 64 pp.

3GPP, Technical Specification, "3rd Generation Partnership Project; Technical Specification Group Radio Access Network; Evolved Universal Terrestrial Radio Access (E-UTRA); Physical Channels and Modulation (Release 9)", 3GPP TS 36.211 V9.1.0 (Mar. 2010), 85 pp.

(Continued)

*Primary Examiner* — Anh Ngoc Nguyen
(74) *Attorney, Agent, or Firm* — Myers Bigel & Sibley, P.A.

(57) ABSTRACT

The present disclosure concerns radio communication. In one of its aspects, the technology presented herein concerns a method for selecting the most suitable secondary carrier for carrier aggregation when employing a combined radio cell including multiple radio sectors A_1, A_2, A_3 of a first Cell (Cell A) and multiple radio sectors B_x, B_y, B_z of a second cell (Cell B).

11 Claims, 9 Drawing Sheets

(56) References Cited

OTHER PUBLICATIONS

3GPP, Technical Specification, "3rd Generation Partnership Project; Technical Specification Group Radio Access Network; Evolved Universal Terrestrial Radio Access (E-UTRA); Multiplexing and channel coding (Release 10)", 3GPP TS 36.212 V10.6.0 (Jun. 2012), 79 pp.

3GPP, Technical Specification, "3rd Generation Partnership Project; Technical Specification Group Radio Access Network; Evolved Universal Terrestrial Radio Access (E-UTRA); Physical layer procedures (Release 10)", 3GPP TS 36.213 V10.6.0 (Jun. 2012), 125 pp.

3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 10)", 3GPP TS 36.300 V10.8.0 (Jun. 2012), 194 pp.

3GPP, Technical Specification, "3rd Generation Partnership Project; Technical Specification Group Radio Access Network; Evolved Universal Terrestrial Radio Access (E-UTRA); Carrier Aggregation; Base Station (BS) radio transmission and reception (Release 10)", 3GPP TR 36.808 V10.0.0 (Jun. 2012), 28 pp.

3GPP, Technical Specification, "3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0 (Mar. 2010), 104 pp.

3GPP, Technical Specification, "3rd Generation Partnership Project; Technical Specification Group Radio Access Network; Further advancements for E-UTRA; LTE-Advanced feasibility studies in RAN WG4 (Release 9)", 3GPP TR 36.815 V9.1.0 (Jun. 2010), 29 pp.

3GPP, Technical Specification, "3rd Generation Partnership Project; Technical Specification Group Radio Access Network; Evolved Universal Terrestrial Radio Access (E-UTRA); Carrier aggregation enhancements; User Equipment (UE) and Base Station (BS) radio transmission and reception (Release 11)", 3GPP TR 36.823 V11.0.1 (Sep. 2013), 35 pp.

3GPP, Technical Specification, "3rd Generation Partnership Project; Technical Specification Group Radio Access Network; Feasibility study for Further Advancements for E-UTRA (LTE-Advanced) (Release 11)", 3GPP TR 36.912 V11.0.0 (Sep. 2012), 62 pp.

3GPP, Technical Specification, "3rd Generation Partnership Project; Technical Specification Group Radio Access Network; Requirements for further advancements for Evolved Universal Terrestrial Radio Access (E-UTRA) (LTE-Advanced) (Release 11)", 3GPP TR 36.913 V11.0.0 (Sep. 2012), 15 pp.

European Search Report, EP Application No. 13178208, Oct. 15, 2013.

Lee et al., "Secondary Serving Cell Selection for Heterogeneous Network With RRH Deployment", 2011 IEEE International Conference on Communications Workshops (ICC), Jun. 5, 2011, pp. 1-5.

\* cited by examiner

SELECTION OF A RADIO CELL SECTOR

CROSS REFERENCE TO RELATED APPLICATION

This application claims priority to European Patent Application No. 13178208.8, filed Jul. 26, 2013, the disclosure and content of which is incorporated herein by reference in its entirety as if set forth fully herein.

TECHNICAL FIELD

Embodiments of the present invention presented herein generally relate to radio communication. More particularly, the embodiments presented herein generally relate to the selection of a radio cell sector of a combined radio cell.

BACKGROUND

This section is intended to provide a background to the various embodiments of the invention that are described in this disclosure. Therefore, unless otherwise indicated herein, what is described in this section should not be interpreted to be prior art by its mere inclusion in this section.

Radio communication networks are widely deployed to provide various communication services such as telephony, video, data, messaging, broadcasts, and so on. Such radio communication networks support communications for multiple user equipments (UEs) by sharing the available network resources. One example of such a network is the Universal Mobile Telecommunications System (UMTS), a third generation (3G) technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places of the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). More detailed descriptions of radio communication networks and systems can be found in literature, such as in Technical Specifications published by, e.g., the 3GPP.

Carrier Aggregation (CA)

Carrier aggregation (CA) can be utilized in radio communication networks in order to increase the bandwidth, and thereby increase the bitrates. Each aggregated carrier is generally referred to as a component carrier (CC). The component carrier can have a bandwidth of 1.4, 3, 5, 10, 15 or 20 MHz and a maximum of five component carriers can be aggregated, hence the maximum aggregated bandwidth is generally 100 MHz. In Frequency Division Duplex (FDD), the number of aggregated carriers can be different in downlink (DL) and uplink (UL). However, the number of UL component carriers is generally equal to or lower than the number of DL component carriers. The individual component carriers can also be of different bandwidths. When Time Division Duplex (TDD) is used, the number of CCs and the bandwidth of each CC are generally the same for DL and UL.

One way to arrange the carrier aggregation is to use contiguous CCs within the same operating frequency band (as defined for LTE), so called intra-band contiguous. This might however not always be possible, due to operator frequency allocation scenarios, etc. For non-contiguous allocation, it could either be intra-band (i.e. the component carriers belong to the same operating frequency band) but have a gap, or gaps, in between. Alternatively, it could be inter-band, in which case the component carriers belong to different operating frequency bands.

When carrier aggregation is used there is generally a number of serving radio cells, one for each component carrier. The coverage of the serving radio cells may differ, both due to component carrier frequencies but also from power planning (which is e.g. useful for heterogeneous network planning). Generally, the RRC (Radio Resource Control) connection is only handled by one cell, the Primary serving cell, served by the Primary component carrier (DL and UL PCC (Primary CC)). It is also on the DL PCC that the UE receives Non-Access Stratum (NAS) information, such as security parameters. In idle mode the UE listens to system information on the DL PCC. On the UL PCC, the PUCCH (Physical Uplink Control Channel) is sent. The other component carriers are all referred to as Secondary component carriers (DL and UL SCC), serving the Secondary serving radio cells. Generally, the SCCs (secondary carrier) are added and removed as required, while the PCC (primary carrier) is only changed at handovers.

Different component carriers can be planned to provide different coverage, i.e. different radio cell size. In the case of inter-band carrier aggregation the component carriers may experience different pathloss, which may increase with increasing frequency. Furthermore, the introduction of carrier aggregation may influence Medium-Access Control (MAC) and the physical layer protocol, but also some new RRC messages are introduced. In order to keep compatibility with earlier 3GPP releases (e.g. Release 8 (Rel8)/Release 9 (Rel-9)), the protocol changes will most likely be kept to a minimum. Basically each component carrier may be treated as a Rel-8 carrier. This way, backwards compability is catered for. Hence, to a Rel-8 UE or a Rel-9 UE (i.e. UEs supporting 3GPP Rel-8 or Rel-9, respectively) each CC will appear as a Rel-8 carrier, while a CA-capable UE can exploit the total aggregated bandwidth, enabling higher data rates.

More detailed descriptions of CA can be found in literature, such as in Technical Reports and Specifications published by the 3GPP. For further reading about CA see for example 3GPP TR 36.808, 3GPP TR 36.814, 3GPP TR 36.815, 3GPP TR 36.823, 3GPP TR 36.912, 3GPP TR 36.913, 3GPP TS 36.211, 3GPP TS 36.212, 3GPP TS 36.213, and 3GPP TS 36.300.

Classical Versus Combined Radio Cell Deployments

In the following, the term point is used to mean a point having transmission and/or reception capabilities. As used herein, this term may interchangeably be referred to as "transmission point", "reception point", "transmission/reception point" or "node". To this end, it should also be appreciated that the term point may include devices such as radio network nodes (e.g. evolved NodeB (eNB), a Radio Network Controller (RNC), etc)) and radio units (e.g. Remote Radio Units (RRUs)). As is known among persons skilled in the art, radio network nodes generally differ from RRUs in that the radio network nodes have comparatively more controlling functionality. For example, radio network nodes typically include scheduler functionality, etc., whereas RRUs typically don't. RRUs are typically consuming comparatively less computational power than radio network nodes. Sometimes, radio network nodes may therefore be referred to as high power points or high power nodes (HPN) whereas RRUs may be referred to as low power points or low power nodes (LPN). In some cell deployments, LPNs are referred to as pico points and HPNs are referred to as macro points. Thus, macro points are points having comparatively higher power than the pico points.

Heterogeneous deployments generally refer to deployments having a mixture of radio cells having different DL transmission power, operating on (at least partially) the same set of frequencies and with overlapping geographic coverage, as is schematically illustrated in FIG. 1. A typical example is a so-called pico cell placed within the coverage area of a comparatively larger radio cell, i.e. the macro cell. The classical way of deploying a radio communication network is thus to let different transmission/reception points form separate cells. That is, the signals transmitted from or received at a transmission/reception point is associated with a cell-id (e.g. a Physical Cell Identity (PCI)) that is different from the cell-id employed for other nearby points. Conventionally, each point transmits its own unique signals for broadcast (PBCH (Physical Broadcast Channel)) and sync channels (PSS (primary synchronization signal), SSS (secondary synchronization signal)). Note that similar principles also apply to classical macro-cellular deployments where all points have similar output power and perhaps are placed in a more regular fashion compared with the case of a heterogeneous deployment.

A recent alternative to the classical cell deployment is to instead let all the UEs within the geographical area outlined by the coverage of the high power point be served with signals associated with the same cell-id (e.g. the same Physical Cell Identity (PCI)). In other words, from a UE perspective, the received signals appear coming from a single radio cell. This is illustrated in FIG. 2 and is generally referred to as combined cell deployment, shared cell deployment or soft cell deployment. Note that only one macro point is shown, other macro points would typically use different cell-ids (corresponding to different radio cells) unless they are co-located at the same site (corresponding to other radio cell sectors of the macro site). In the latter case of several co-located macro points, the same cell-id may be shared across the co-located macro points and those pico points that correspond to the union of the coverage areas of the macro points. In a combined radio cell, the comparatively larger radio cell 10c may be referred to as the radio cell whereas the smaller radio cells 20-1c, 20-2c, 20-3c may be referred to as radio cell sectors or sectors. Sync channels, BCH (Broadcast Channels) and control channels may all be transmitted from the high power point while data can be transmitted to a UE also from low power points by using shared data transmissions (e.g. a Physical Downlink Shared Channel (PDSCH)) relying on UE specific resources.

The single cell-id approach, or combined cell deployment, can be geared towards situations in which there is fast backhaul communication between the points associated to the same cell. A typical case would be a base station serving one or more sectors on a macro level as well as having fast fiber connections to remote radio units (RRUs) playing the role of the other points sharing the same cell-id. Those RRUs could represent low power points with one or more antennas each. Another example is when all the points have a similar power class with no single point having more significance than the others. The base station would then handle the signals from all RRUs in a similar manner.

An advantage of the combined cell deployment compared with the classical deployment is that the typically involved handover procedure between cells may only need to be invoked on a macro basis. Moreover, there is generally also greater flexibility in coordination and scheduling among the points which means the network can avoid relying on the potentially inflexible concept of semi-statically configured "low interference" subframes as in Rel-10. A combined cell approach also allow decoupling of the downlink (DL) with the uplink (UL) so that for example path loss based reception point selection can be performed in UL while not creating a severe interference problem for the DL, where the UE may be served by a transmission point different from the point used in the UL reception.

It should be appreciated that a combined cell deployment may bring further advantages when used in combination with Spatial Division Multiplexing (SDM). For example, assume a radio cell having three radio sectors employing 20 MHz (megahertz) bandwidth with 100 PRBs (Physical Resource Blocks), all the radio sectors share the 100 PRBs if SDM is not supported. However, if SDM is supported all three radio sector may be isolated by means of SDM and, as a consequence, the three radio sectors can utilize 100 PRBs each, thus increasing the overall throughput of the combined radio cell.

SUMMARY

It is in view of the above considerations and others that the various embodiments disclosed herein have been made.

The inventors have realized that the combined cell approach (or, combined cell deployment) introduces one or more challenges when employing carrier aggregation. This may be particularly so for carrier aggregation with imbalance between UL and DL carriers, for example when there are two DL carriers, but only one UL carrier (which is by the way the typical case in many radio communication networks today). With reference to FIG. 3, one example scenario is illustrated. A coverage area, such as a house building, is covered by a combined radio cell deployment supporting carrier aggregation. Coverage of the whole area (i.e. the whole building in this example) is made possible by two different radio cells, denoted Cell A and Cell B respectively. Cell A and Cell B operate with different frequency carriers, Carrier A and Carrier B. That is, Cell A uses Carrier A, whereas Cell B uses Carrier B. Without limitation, the focus will be on DL CA in the following. This implies that the UE shown in FIG. 3 can receive data from both Carrier A and Carrier B, but UL data is only transmitted via the primary carrier (i.e. the carrier (or, radio cell) where the UE is currently registered). Each radio cell is divided into, or comprises, three different radio sectors covering three different coverage areas (e.g. three different floors of the building in the illustrated example). That is, Cell A comprises radio sectors A_1, A_2 and A_3. Likewise, Cell B comprises radio sectors B_x, B_y, B_z. As used herein, the term radio sector or radio cell sector is sometimes referred to as carrier sector (e.g. primary carrier sector or secondary carrier sector)

Assume that the UE located on floor 2 is a CA-capable UE currently using Cell A as its primary radio cell and Cell B as a secondary DL cell. This would mean that such UE can receive DL data via both Carrier A (the primary carrier) and Carrier B (the secondary carrier), but can only send UL data using Carrier A. Generally, in order to use the SDM or in order mitigate any interference, the Cell A should thus generally select the most suitable radio sector (i.e. A_1, A_2 or A_3) to communicate with the UE, typically based on UL signals. For example, UL reference signals (RS), (e.g. UL sounding reference signal (SRS)) can be used for this purpose. In this exemplary scenario, Cell A would use the Sector A_2 to communicate with the UE. Thus, the radio sector A_2 would be used as the primary radio sector. However, the Cell A (or rather the radio network node serving, or controlling, Cell A) is generally not aware of which second carrier sector is to be used by this particular UE when employing CA with radio sector A_2. The radio sectors belonging to, or forming, Cell B generally operate in a different frequency and any transmission/reception points could potentially also have completely different geographical locations. All in all, this makes Cell A unaware of which sector in Cell B shall be used to communicate with the UE as a secondary carrier. The current solution to this challenge is to use all the radio sectors B_x, B_y, B_z to aggregate with Cell A. This means that no radio sector selection is made. In such case, the data would only be transmitted in radio sector A_2 under carrier A, and aggregated with radio sectors B_x, B_y, B_z under carrier B. This is the simplest solution, but this solution may not be sufficient in some scenarios. For example, when the different radio sectors are at least partially isolated from each other (e.g. when employing SDM), this may be a disadvantageous solution. It may consequently be desirable that the Cell A becomes aware of which radio sector of Cell B to use as its secondary radio cell sector. A straightforward solution to this challenge would to be to manually configure each possible pair of Sectors A and Sectors B for carrier aggregation, e.g. during the deployment of Cell A and Cell B. The operator could configure the CA deployment in any suitable or desired manner, e.g. for aggregation Sector A_1-Sector B_x, Sector A_2-Sector B_y, Sector A_3-Sector B_z, etcetera. However, such manual configuration might be cumbersome for the operator in case of deployment of the combined radio cells, or if frequent changes occur in the radio cell sector planning.

It has therefore been an aim to provide an alternative, or improved, way of selecting a radio cell sector.

The various embodiments of the present invention as set forth in the appended independent claims address this general aim. The appended dependent claims represent additional advantageous embodiments of the present invention.

According to a first aspect, there is provided a method performed by, or otherwise implemented in, a base station for selecting a secondary carrier sector (e.g., B_x, B_y, B_z) of a second radio cell (e.g., Cell B) to be used by a user equipment (UE) when employing carrier aggregation. The base station is serving a first radio cell (e.g. Cell A) as well as a second radio cell (e.g. Cell B). The second radio cell is at least partially overlapping the first radio cell. Furthermore, the base station is controlling multiple radio units (e.g. RRUs) each of which is serving a respective primary carrier sector (e.g., A_1, A_2, A_3, A_n) of the first radio cell. The base station is also controlling multiple radio units (e.g. RRUs) each of which is serving a respective secondary carrier sector (e.g., B_x, B_y, B_z) of the second radio cell (Cell B).

Information related to powers of all primary carrier sectors is collected. Based on the collected information, the powers of all primary carrier sectors are compared. It is determined which one of the primary carrier sectors has the highest power. It is also determined which one of the primary carrier sectors has the next highest power. The determined highest power is compared with a first threshold value. Also, a difference between the highest power and the next highest power is compared with a second threshold value. Responsive to the highest power being above the first threshold as well as the difference between the highest power and the next highest power being above the second threshold value at least one selected user equipment is ordered, or requested, to perform a Inter-Frequency Handover (IFHO) from a primary carrier (e.g. Carrier A) to a secondary carrier (e.g. Carrier B). In response thereto, information related to powers of all secondary carrier sectors of the second radio cell is collected. Based on this collected information, the powers of all secondary carrier sectors are compared. Furthermore, it is determined which one of the secondary carrier sectors has the highest power. Subsequently, the secondary carrier sector with the highest power is selected to become the secondary carrier sector to be used.

In one embodiment, the method additionally comprises determining which one of the secondary carrier sectors has the next highest power. The highest power (of the secondary carrier sector with the highest power) is compared with a third threshold value, which may be same threshold value as the above-mentioned first threshold value. Also, a difference between the highest power (of the secondary carrier sector having the highest power) and the next highest power (of the secondary carrier sector having the next highest power) is compared with a fourth threshold value, which may be same threshold value as the above-mentioned second threshold value. Responsive to the highest power (of the secondary carrier sector having the highest power) being above said third threshold as well as the difference between the highest power and the next highest power (of the two secondary carrier sectors, respectively) being above said fourth threshold value, the secondary carrier sector with the highest power is selected to become the secondary carrier sector to be used.

In one embodiment, it is checked whether the secondary carrier sector with the highest power is already registered by the base station to be the secondary carrier sector to be used. In this embodiment, the secondary carrier sector having the highest power is selected to be the secondary carrier sector to be used only in response to the secondary carrier sector already being registered by the base station to be the secondary carrier sector to be used.

According to a second aspect, there is provided a base station for implementing the method according to the first aspect. To this end, a base station for selecting a secondary carrier sector of a second radio cell to be used by a user equipment (UE) when employing carrier aggregation is proposed. The base station may be an evolved NodeB (eNB). Furthermore, the base station is configured to serve a first radio cell as well as a second radio cell. The second radio cell is at least partially overlapping the first radio cell. The base station is configured to control multiple radio units each of which is configured to serve a respective primary carrier sector of the first radio cell. Moreover, the base station is also configured to control multiple radio units each of which is configured to serve a respective secondary carrier sector of the second radio cell.

In one exemplary implementation, the base station comprises a communication interface for wireless communication with the multiple radio units and for communication with at least one user equipment, a processor and a memory. The memory stores computer program code which, when run in the processor, causes the base station to: collect information related to powers of all primary carrier sectors; based thereon compare the powers of all primary carrier sectors and determining which one of the primary carrier sectors has the highest power and which one of the primary carrier sectors has the next highest power; compare the highest power with a first threshold value; compare a difference between the highest power and the next highest power with a second threshold value; responsive to the highest power being above the first threshold as well as the difference between the highest power and the next highest power being above the second threshold value order one or more selected user equipments to perform a Inter-Frequency Handover (IFHO) from a primary carrier to a secondary carrier; in response thereto collect information related to powers of all secondary carrier sectors of the second radio cell; based thereon compare the powers of all secondary carrier sectors and determining which one of the secondary carrier sectors has the highest power; and select the secondary carrier sector with the highest power to become the secondary carrier sector to be used.

In one embodiment, the memory stores computer program code, which, when run in the processor causes the base station to determine which one of the secondary carrier sectors has the next highest power. Furthermore, the highest power (of the secondary carrier sector with the highest power) is compared with a third threshold value, which may be same threshold value as the above-mentioned first threshold value. Also, a difference between the highest power (of the secondary carrier sector having the highest power) and the next highest power (of the secondary carrier sector having the next highest power) is compared with a fourth threshold value, which may be same threshold value as the above-mentioned second threshold value. Responsive to the highest power (of the secondary carrier sector having the highest power) being above said third threshold as well as the difference between the highest power and the next highest power (of the two secondary carrier sectors, respectively) being above said fourth threshold value, the secondary carrier sector with the highest power is selected to become the secondary carrier sector to be used.

In one embodiment, the memory stores computer program code, which, when run in the processor causes the base station to check whether the secondary carrier sector with the highest power is already registered by the base station to be the secondary carrier sector to be used; and select the secondary carrier sector with the highest power to be the secondary carrier sector to be used only in response to the secondary carrier sector with the highest power also being registered by the base station to be the secondary carrier sector to be used.

The various embodiments described herein may provide several advantages. By ordering, or requesting, at least one selected UE to perform an IFHO from the primary carrier (e.g. Carrier A) to a secondary carrier (e.g. Carrier B) it is made possible to evaluate which one of multiple secondary radio sectors is the best available, or most suitable. More particularly, by moving the UE to another carrier (i.e. the secondary carrier), it is made possible for the base station to evaluate powers of the different secondary radio sectors. Once evaluated, the base station can select, or otherwise determine, which one of the secondary radio sectors should be used by the UE as its secondary radio sector. The proposed embodiments may thus allow for a more dynamic selection of radio sector to be used by a UE as a secondary radio sector. The dynamic selection of radio sector thus also provides an alternative, and improved, way of selecting radio sectors to be used by a UE as secondary radio sectors. Furthermore, the selection of radio sector may me performed without manual configurations of the combined radio cell.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The invention will now be described more fully hereinafter with reference to the accompanying drawings, in which certain embodiments are shown. The invention may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

As used throughout this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC devices, which do not necessarily involve human interaction. In this regard, it should also be appreciated that the term "user equipment (UE)" as used herein may apply the definition as specified on page 33 of 3GPP TR 21.905 V.12.0.0 (2013-06). Furthermore, it should be appreciated that the term "base station" as used herein may apply the definition as specified on page 8 of 3GPP TR 21.905 V.12.0.0 (2013-06). The base station may also be referred to as a Radio Base Station (RBS), a NodeB, an evolved NodeB (eNB), etc.

In one of its aspects, the technology presented herein concerns a method for finding, and selecting, the most suitable (e.g. best) secondary carrier for CA when employing a combined radio cell.

Figure 1:
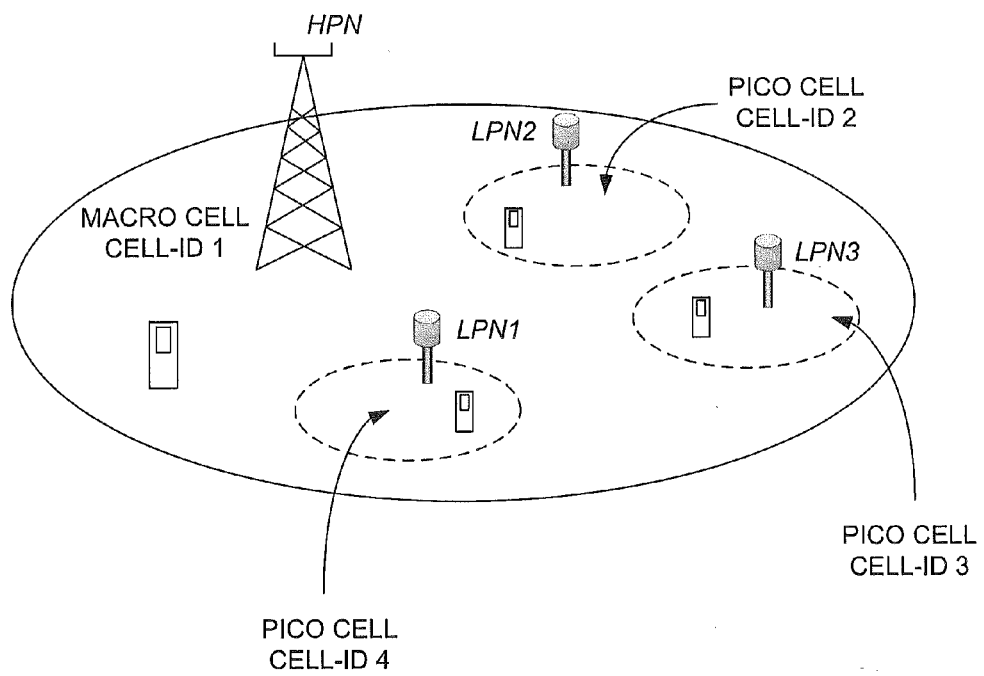
FIG. 1 shows an example of a heterogeneous radio network utilizing a classical cell deployment.
Figure 2:
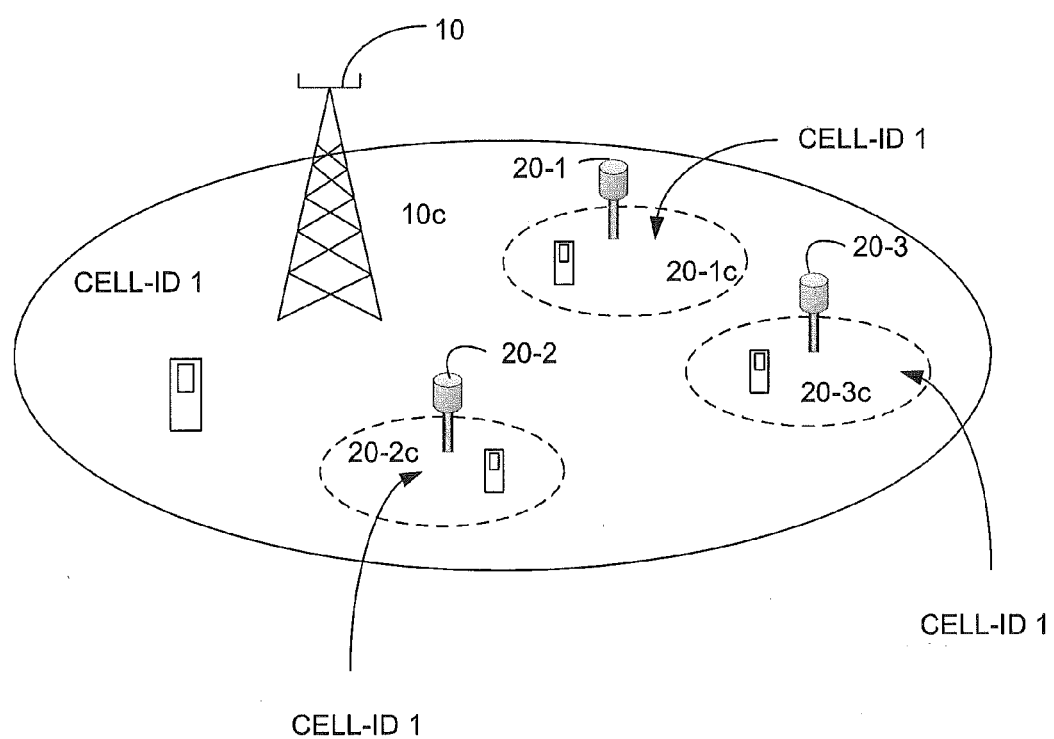
FIG. 2 shows an example of a radio network utilizing a combined cell deployment.
Figure 3:
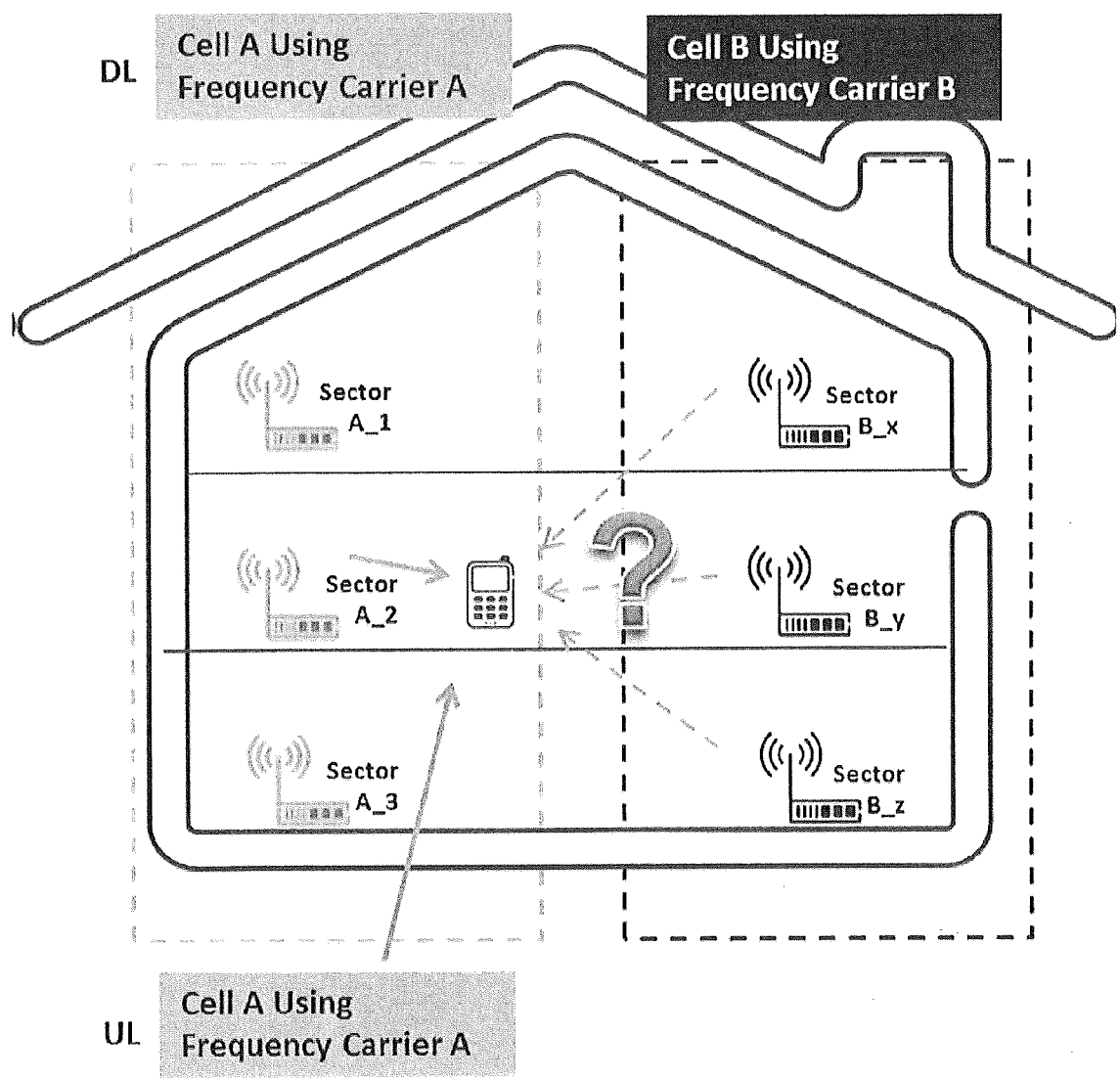
FIG. 3 shows an example scenario where embodiments of the present invention can be carried out.
Figure 4:
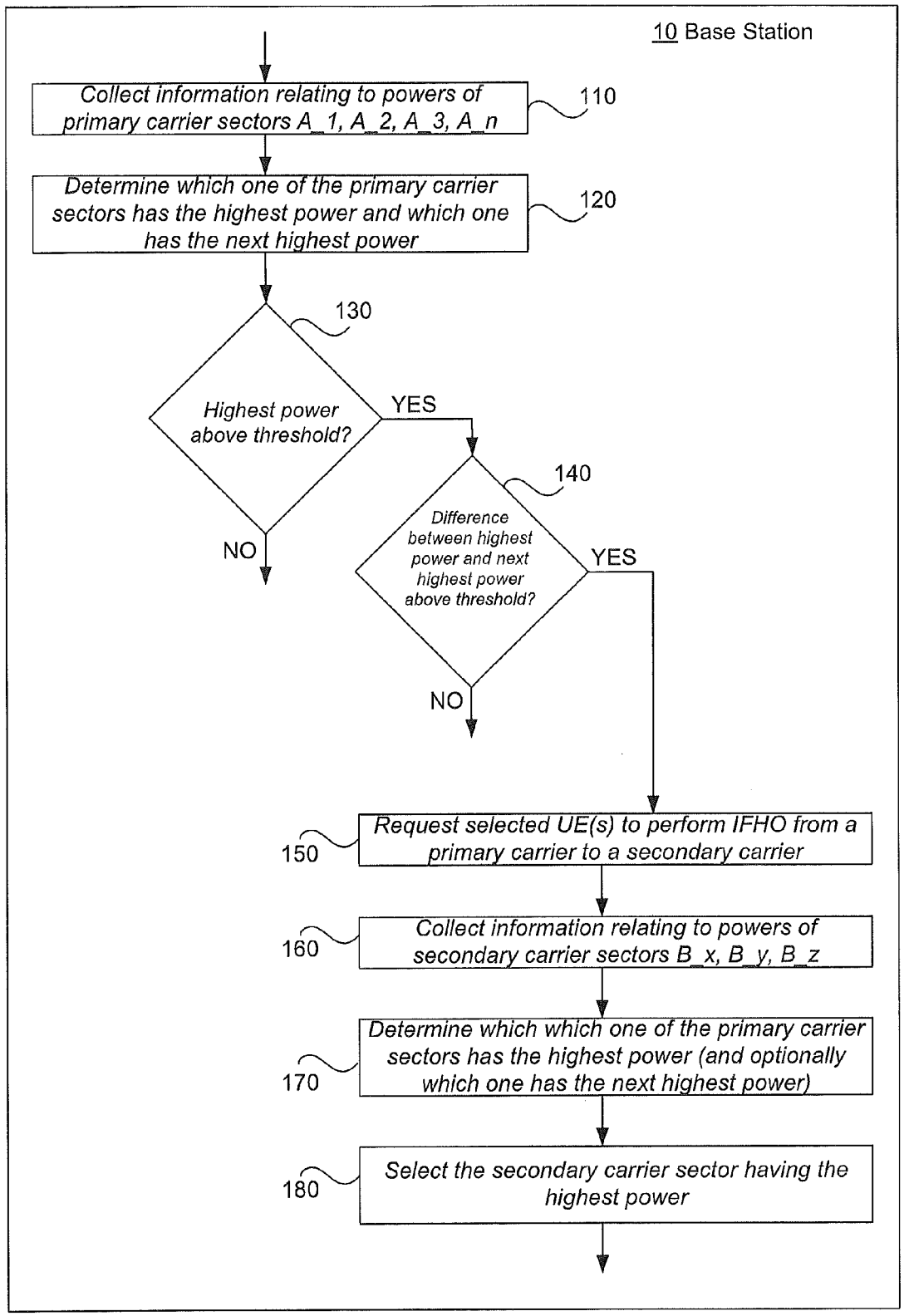
FIG. 4 is a flowchart of an example method performed by a base station.

With reference to the exemplary scenario described with respect to FIG. 3 and with further reference to FIG. 4, a first embodiment will now be described. FIG. 4 illustrates a method performed by a base station 10. Assume that the base station 10 is serving a first radio cell, e.g. Cell A in FIG. 3. Further, assume that the base station 10 is also serving a second radio cell, e.g. Cell B in FIG. 3. The second radio cell (Cell B) is at least partially overlapping the first radio cell (Cell A). Furthermore, the base station is controlling multiple radio units, e.g. RRUs. Each of the radio units is serving a respective primary carrier sector, i.e. A_1, A_2, A_3, A_n in FIG. 3. The base station 10 is also controlling multiple radio units (e.g. RRUs) each of which is serving a respective secondary carrier sector, i.e. B_x, B_y, B_z in FIG. 3.

Information related to powers of all primary carrier sectors A_1, A_2, A_3 is collected 110. This information related to powers can be collected in various ways. For example, the base station 10 may receive this information from the various radio units serving the different radio sectors A_1, A_2, A_3. Or said differently, the base station 10 may receive radio signals from these radio units, wherein the radio signals include an information element (IE) comprising the information about the power of the respective primary carrier sectors A_1, A_2, and A_3.

For example, when a UE is requesting a connection set-up to the first radio cell (Cell A), the UE generally initiates a Random Access (RA) procedure. The RA procedure as such is known to persons skilled in the art and will therefore not be detailed herein. Once the RA procedure is initiated, the different radio sectors (or rather the different radio units serving these radio sectors) can begin listening to the RA preambles transmitted from the UE. By listening to the RA preambles, the different radio units can determine the power according to existing techniques. The information about the determined power may be stored locally (e.g. temporarily) at the different radio units. The radio units may also transmit the information about the determined power to the base station 10. That is, each of the radio units may transmit a radio signal to the base station 10, wherein the radio signal includes an information element (IE) comprising the information about the determined power.

Based on the information about powers, the base station 10 compares 120 powers of all primary carrier sectors in order to evaluate which of the primary radio sectors has the highest power. It is thus determined 120 which one of the primary carrier sectors has the highest power. It is also determined 120 which one of the primary carrier sectors (i.e. A_1, A_2, A_3) has the next highest power.

The determined highest power is compared 130 with a first threshold value. Also, a difference between the highest power and the next highest power is compared 140 with a second threshold value.

Responsive to the highest power being above the first threshold as well as the difference between the highest power and the next highest power being above the second threshold value, at least one selected user equipment (e.g., the UE on the second floor of the building in FIG. 3 in this example scenario) can be ordered, or requested, by the base station 10 to perform 150 a Inter-Frequency Handover (IFHO) from the primary carrier (i.e. Carrier A in this example) to a secondary carrier (i.e. Carrier B in this example). Thus, the UE is moved from the primary carrier to the secondary carrier.

It should be appreciated that the above-mentioned threshold values may have different values in different scenarios. The threshold values may e.g. vary in dependence of needs, requirements, and/or demands from the operator (and/or end-users). In turn, these may vary depending on cell planning variables such as cell size, degree of isolation between radio sectors, presence of walls (if the radio cells cover a building), indoor environment vs. outdoor environment, etcetera. Additionally, or alternatively, the threshold values may vary in dependence of UE specific needs or requirements. Nevertheless, it is proposed to select a sufficiently large value of the first threshold such that the threshold value corresponds to a value where the UE could still be connected to the second radio cell after a handover or maintain its previous level of QoS (Quality of Service). Since the selected UE will be ordered to perform an IFHO, the UE would loose its connection if the power was too low (i.e. the signal was too weak), or alternatively experiences a relatively long handover interruption time period. Furthermore, it is proposed to select a proper value of the second threshold value for the purpose of filtering out UEs that are less suitable for performing the IFHO, e.g. UEs at radio cell sector boarders or UEs being located at a location where several radio cell sectors are overlapping. As will be understood, the combination of threshold values are to be selected in such a way that the two threshold values together form a proper criteria for when to order, or request, the at least one UE to perform an IFHO. In other words, the exact threshold values should preferably be tested, evaluated and selected from scenario to scenario depending on needs, requirements and/or demands.

Once the UE has been moved from the primary carrier to secondary carrier, information related to powers of all secondary carrier sectors of the second radio cell can be collected 160. Again, the information related to powers can be collected in various ways. For example, the base station 10 may receive this information from the various radio units serving the different radio sectors B_x, B_y, B_z. Or said differently, the base station 10 may receive radio signals from these radio units, wherein the radio signals include an information element (IE) comprising the information about the power of the respective secondary carrier sectors B_x, B_y, B_z.

For example, when a UE is moving from the primary carrier (Carrier A) to the secondary carrier (Carrier B), the radio units serving the radio sectors (or carrier sectors) of Cell B may determine, or otherwise estimate, the powers on measurements of UL signals, such as SRS measurements (or alternatively by listening to RA preambles). Determining powers on the basis of SRS measurements is, as such, known to persons skilled in the art and will therefore not be detailed herein. The information about the determined power may be stored locally (e.g. temporarily) at the different radio units serving the radio sectors of the second cell (Cell B). The radio units may also transmit the information about the determined power to the base station 10. That is, each of the radio units may transmit a radio signal to the base station 10, wherein the radio signal includes an information element (IE) comprising the information about the determined power.

Based on the collected information about the powers of all secondary carrier sectors B_x, B_y, B_z, these powers are compared 170. Furthermore, it is determined 170 which one of the secondary carrier sectors has the highest power. Subsequently, the secondary carrier sector with the highest power can be selected 180 to become the secondary carrier sector to be used.

In one embodiment, the method additionally comprises determining 170 which one of the secondary carrier sectors has the next highest power. If so, the highest power (of the secondary carrier sector having the highest power) is also compared with a third threshold value, which may e.g. be same threshold value as the earlier-mentioned first threshold value. Also, a difference between the highest power (of the secondary carrier sector having the highest power) and the next highest power (of the secondary carrier sector having the next highest power) is compared with a fourth threshold value, which may e.g. be same threshold value as the earlier-mentioned second threshold value. In this embodiment, the secondary carrier sector with the highest power is selected 180 to become the secondary carrier sector to be used only if, or when, the highest power (of the secondary carrier sector having the highest power) is above the third threshold as well as the difference between the highest power and the next highest power (of the two secondary carrier sectors, respectively) is above the fourth threshold value, In one embodiment, it may be checked whether the secondary carrier sector having the highest power is already registered (e.g. in a memory) by the base station to be the secondary carrier sector to be used. In this embodiment, the secondary carrier sector having the highest power is selected to be the secondary carrier sector to be used only in response to the secondary carrier sector already being registered by the base station to be the secondary carrier sector to be used.

By ordering the UE to perform an IFHO from the primary carrier (e.g. Carrier A) to a secondary carrier (e.g. Carrier B) it is made possible to evaluate which one of multiple secondary carrier sectors (B_x, B_y, or B_z) is the best available, or most suitable, secondary carrier sector for a UE in question. More particularly, by moving the UE to another carrier (i.e. the secondary carrier), it is made possible for the base station to evaluate powers of the different secondary radio sectors. Once evaluated, the base station can select, or otherwise determine, which one of the secondary radio sectors should be used by the UE as its secondary radio sector. This may allow for a dynamic selection of a secondary radio sector to be used by a UE supporting CA and which is operating in a combined radio cell deployment.

Figure 5:
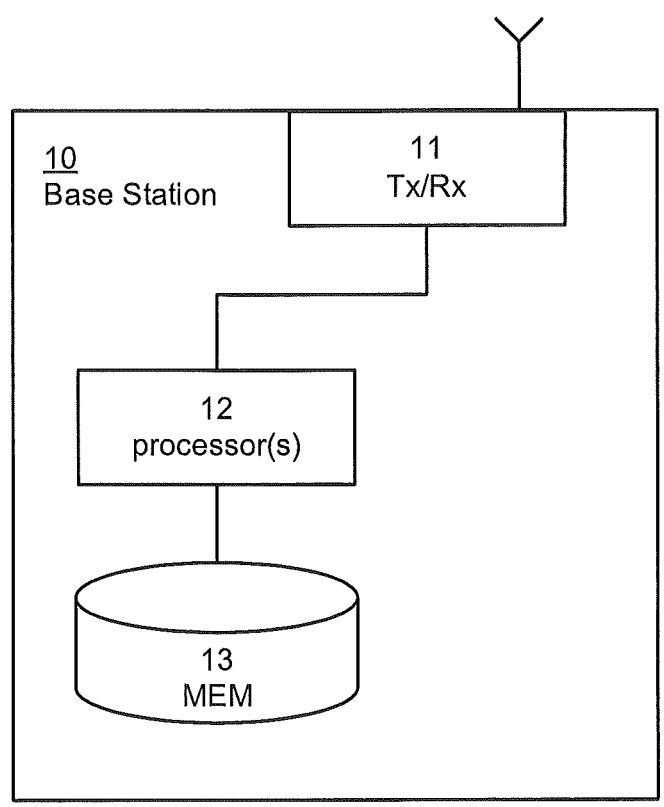
FIG. 5 shows an example implementation of a base station.

FIG. 5 shows an example implementation of a base station, such as a eNB, which is configured to perform the above-mentioned method. To this end, the base station 10 comprises a communication interface 11 for wireless communication with the multiple radio units and for communication with at least one UE, a processor 12 and a memory 13. The communication interface 11 may comprise a transmitter (Tx) and a receiver (Rx). Alternatively, the communication interface may comprise a transceiver (Tx/Rx) having both transmission and reception capabilities.

The memory 13 stores computer program code which, when run in the processor 12, causes the base station 10 to: collect information related to powers of all primary carrier sectors; based thereon compare the powers of all primary carrier sectors and determining which one of the primary carrier sectors has the highest power and which one of the primary carrier sectors has the next highest power; compare the highest power with a first threshold value; compare a difference between the highest power and the next highest power with a second threshold value; responsive to the highest power being above the first threshold as well as the difference between the highest power and the next highest power being above the second threshold value order a selected user equipment to perform a IFHO from a primary carrier to a secondary carrier; in response thereto collect information related to powers of all secondary carrier sectors of the second radio cell; based thereon compare the powers of all secondary carrier sectors and determining which one of the secondary carrier sectors has the highest power; and select the secondary carrier sector with the highest power to become the secondary carrier sector to be used.

In one embodiment, the memory stores computer program code, which, when run in the processor causes the base station to check whether the secondary carrier sector with the highest power is already registered by the base station to be the secondary carrier sector to be used; and select the secondary carrier sector with the highest power to be the secondary carrier sector to be used only in response to the secondary carrier sector with the highest power also being registered by the base station to be the secondary carrier sector to be used.

Various Detailed Implementation Alternatives

In the following, various detailed implementation alternatives will be further described. As used in the following, the expression "aggregatable carrier sector" is used to define a relationship between radio sectors of different radio cells in a combined radio cell deployment. For example, radio sector B_y may be an aggregatable carrier sector of radio sector A_2. Likewise, radio sector B_x may be an aggregatable carrier sector of radio sector A_1. Likewise, radio sector B_z may be an aggregatable carrier sector of radio sector A_3. Other relationships are also conceivable, such as A_1-B_y, A_2-B_z, etcetera.

Alternative 1—Detection of Aggregatable Carrier Sectors:

This alternative allows an evaluation of aggregatable carrier sectors for a UE that is connecting to a first radio cell (e.g. Cell A). A possible output is the triggering of a IFHO (see FIG. 6).

Figure 6:
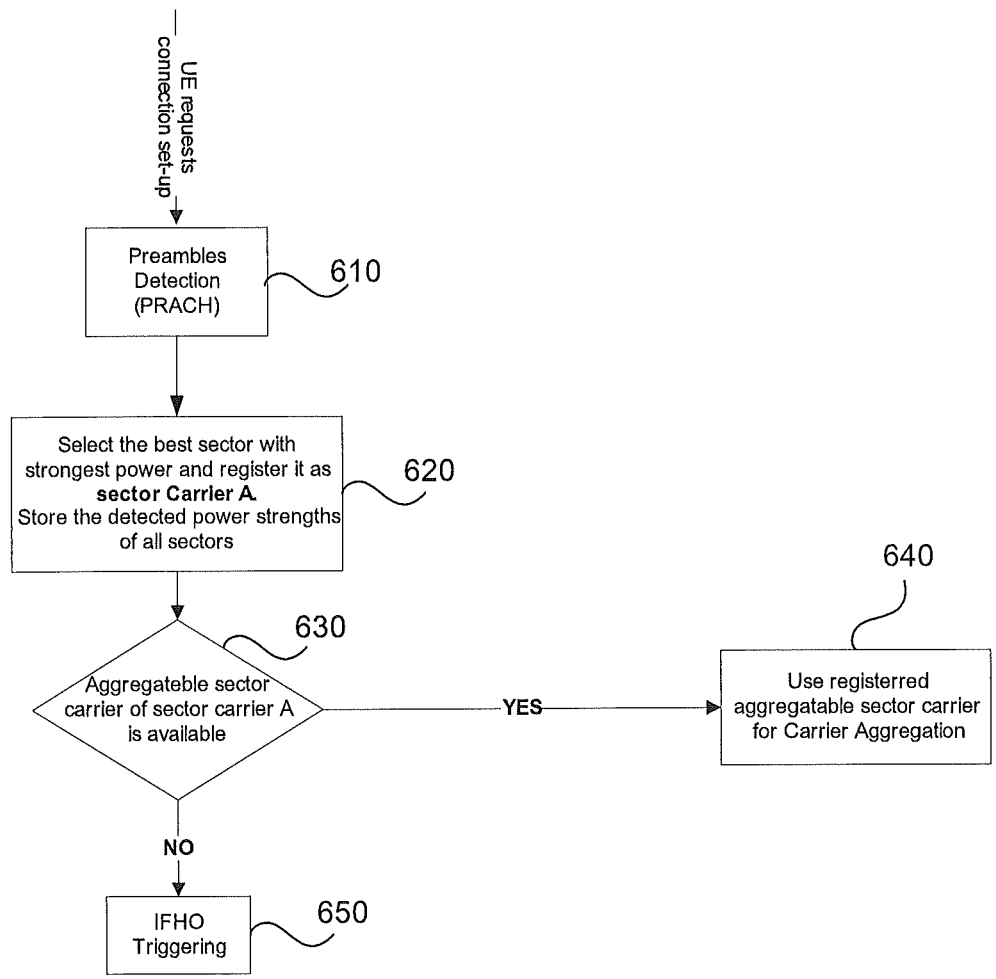
FIGS. 6-8 show flowcharts of various example methods.

FIG. 6 shows a flowchart illustrating a method according to this alternative. A UE requests connection set-up to a first radio cell (e.g. Cell A). In other words, and as described earlier herein, the UE initiates a Random Access (RA) procedure. Once the RA procedure is initiated, the different radio sectors (or rather the different radio units serving these radio sectors) of the first radio cell (Cell A) can begin listening 610 to the RA preambles transmitted from the UE. By listening to the RA preambles, the different radio units can determine the respective power according to existing techniques. The information about the determined power may be stored locally (e.g. temporarily) at the different radio units. As described earlier, the radio units may also transmit the information about the determined power to the base station 10. That is, each of the radio units may transmit a radio signal to the base station 10, wherein the radio signal includes an information element (IE) comprising the information about the determined power.

Based on the information about powers, the base station 10 compares 620 powers of all primary carrier sectors A_1, A_2, A_3 in order to evaluate which of the primary radio sectors has the highest power. It is thus determined 620 which one of the primary carrier sectors has the highest power.

It is also determined 630 if the primary radio sector having the highest power already has an aggregatable carrier sector registered. That is, it is determined whether there exists an already stored relationship between the primary radio sector having the highest power (e.g. A_2) and any of the secondary radio cell sectors (e.g. B_x, B_y, or B_z) of the second radio cell (Cell B). If there already exists such relationship, i.e. if an aggregatable carrier sector is registered at the base station 10, then the already registered aggregatable carrier sector can be utilized 640. Otherwise, an IFHO may be triggered 650. This will be further described with respect to alternative 2 hereinbelow.

Figure 7:
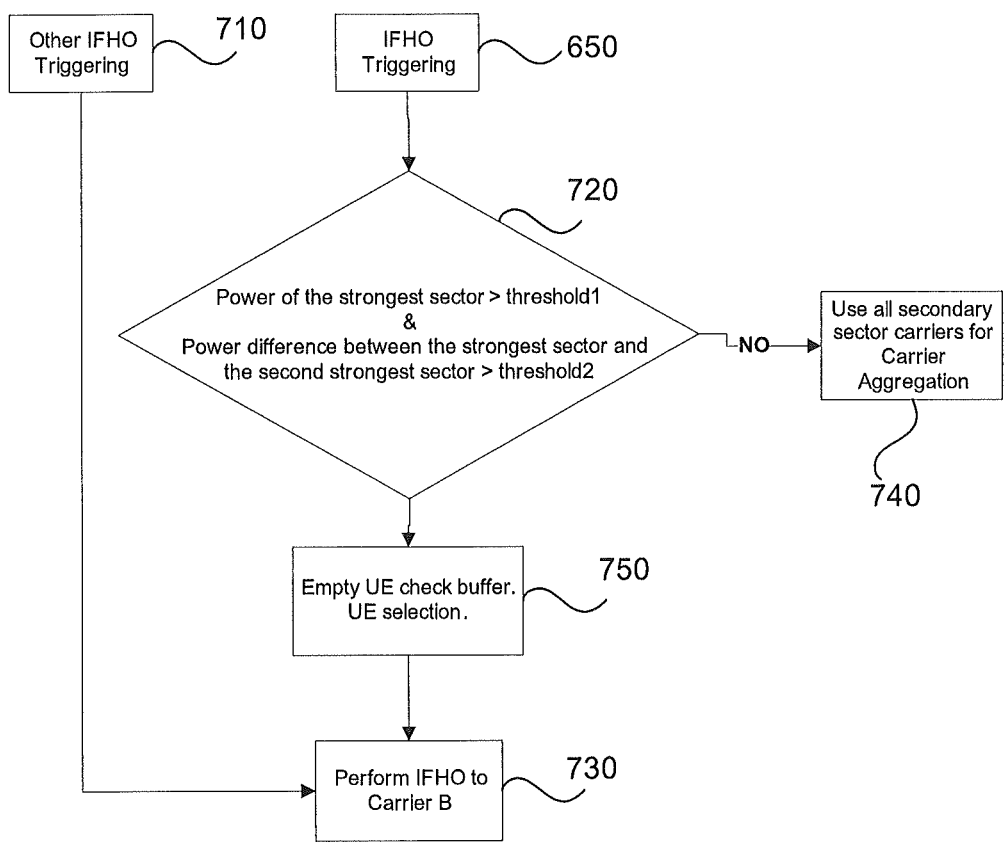

Alternative 2—Triggering of Inter-Frequency Handover (IFHO):

With reference to FIG. 7, this alternative begins with the triggering 650 of an IFHO. For example, if it has been determined that there exists no aggregatable carrier sectors (see alternative 1 hereinabove), the IFHO may be triggered 650. In some implementations, the base station may include a timer, or timer functionality, to periodically check the whether there exists aggregatable carrier sectors. There may exist other reasons why IFHO is triggered 710. For example, in case the base station wishes to override previously registered aggregatable carrier sectors. Another conceivable reason could be a load balancing reason.

It is determined 720 which one of the primary carrier sectors has the highest power. It is also determined 720 which one of the primary carrier sectors has the next highest power. The determined highest power is compared 720 with a first threshold value. Also, the difference between the highest power and the next highest power is compared 720 with a second threshold value.

Responsive to the highest power being above the first threshold as well as the difference between the highest power and the next highest power being above the second threshold value, the user equipment can be ordered, or requested, by the base station 10 to perform 730 an IFHO from the primary carrier (i.e. Carrier A in this example) to a secondary carrier (i.e. Carrier B in this example). Otherwise, the base station 10 can trigger the usage of all secondary carrier sectors for carrier aggregation.

As described earlier, the above-mentioned threshold values may have different values in different scenarios. The threshold values may e.g. vary in dependence of needs, requirements, and demands from the operator and/or end-users and/or UE specific requirements (e.g. if the UE is supporting a certain 3GPP Release). In turn, these may vary depending on cell planning variables such as cell size, degree of isolation between radio sectors, presence of walls (if the radio cells cover a building), indoor environment vs. outdoor environment, etcetera. Nevertheless, it is proposed to select a sufficiently large value of the first threshold corresponding to that the UE could still be connected to the first radio cell after a handover or maintain its QoS. Since the selected UE will be ordered to perform an IFHO, the UE would loose its connection if the power was too low (i.e. the signal was too weak). Furthermore, it is proposed to select a proper value of the second threshold value for the purpose of filtering out UEs that are less suitable for performing the IFHO, e.g. UEs at radio cell sector boarders or UEs being located at a location where several radio cell sectors are overlapping. As will be understood, the combination of threshold values is to be selected in a way such they together form a proper criteria for when to order one (or more) UE to perform an IFHO.

If a UE is experiencing good isolation with respect to other radio cell sectors, e.g. if the UE is located in a radio sector center, such UE is generally suitable to perform the IFHO. The base station 10 can thus order, or request, such UE to perform IFHO from its primary carrier (Carrier A in this example) to a secondary carrier (Carrier B in this example).

As can be seen in FIG. 7, the base station 10 may optionally also try to empty a buffer of the UE in order to minimize, or at least reduce, any impact of the IFHO in some scenarios.

Figure 8:
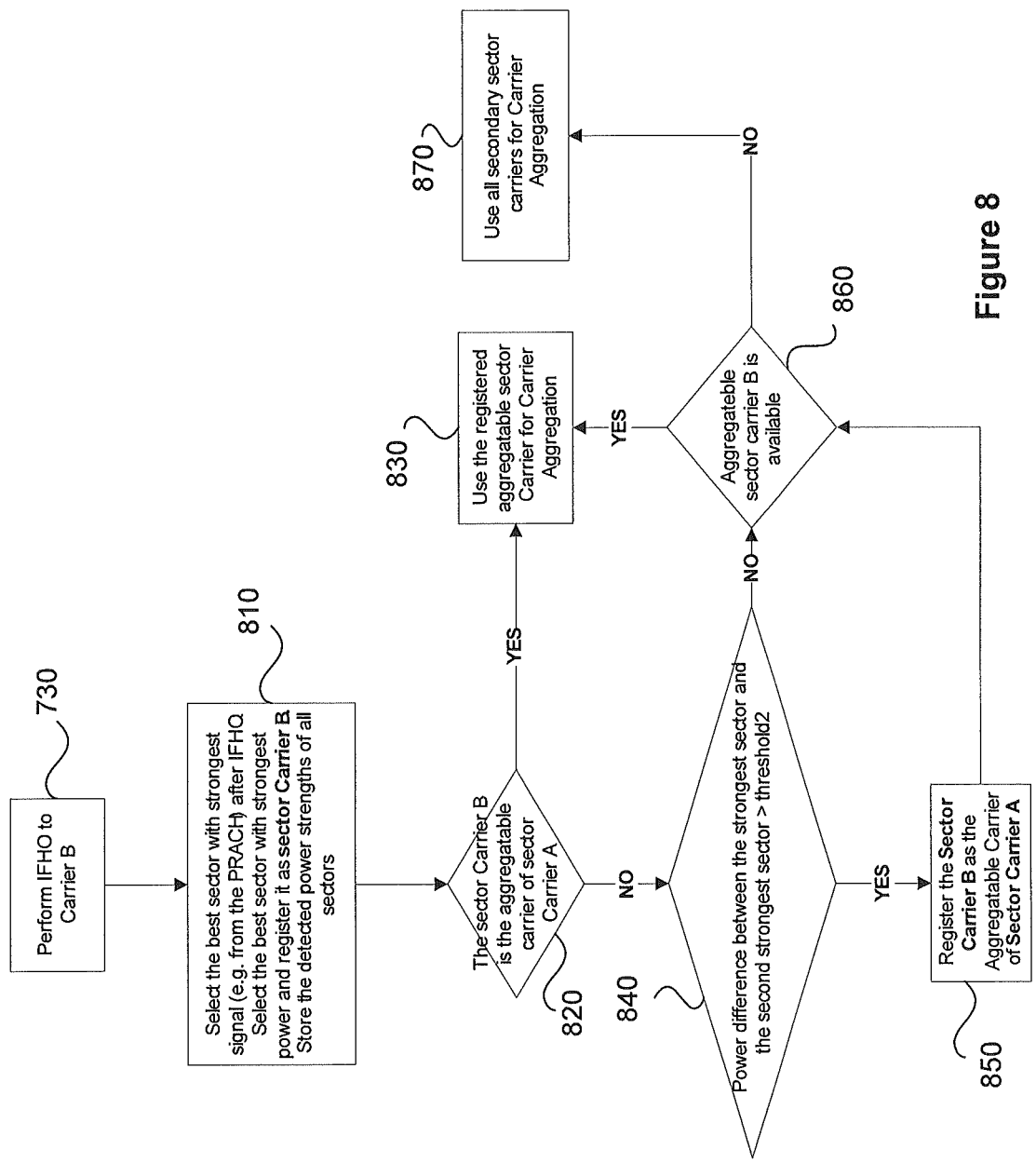

Alternative 3—Secondary Sector Carrier Verification:

With reference to FIG. 8, this alternative begins with the execution of the IFHO 730. Once the UE has been moved from the primary carrier to secondary carrier, information related to powers of all secondary carrier sectors of the second radio cell can be collected. Again, the information related to powers can be collected in various ways. For example, the base station 10 may receive this information from the various radio units serving the different radio sectors $B\_x, B\_y, B\_z$. Or said differently, the base station 10 may receive radio signals from these radio units, wherein the radio signals include an information element (IE) comprising the information about the respective powers of all secondary carrier sectors $B\_x, B\_y, B\_z$. To this end, and as described earlier, all the radio sectors $B\_x, B\_y, B\_z$ of the second radio cell (Cell B) (or rather the radio units controlling the respective radio sectors) may perform measurements of UL signals (e.g. by listening to RA preambles transmitted from the UE or, alternatively, perform SRS measurements) to determine the respective powers. The information about the determined power may be stored locally (e.g. temporarily) at the different radio units serving the radio sectors of the second cell (Cell B). The radio units may also transmit the information about the determined power to the base station 10. That is, each of the radio units may transmit a radio signal to the base station 10, wherein the radio signal includes an information element (IE) comprising the information about the determined power. Optionally, the received information about the powers of all secondary carrier sectors $B\_x, B\_y, B\_z$, can be stored (e.g. in a memory) by the base station 10. Furthermore, the powers of all secondary carrier sectors $B\_x, B\_y, B\_z$, can be can be compared 810 by the base station. Furthermore, the base station determines 810 which one of the secondary carrier sectors has the highest power. It is also checked 820 whether this secondary carrier sector having the highest power is already registered (i.e. stored in a memory of the base station 10) as the aggregatable carrier. If the secondary carrier sector having the highest power is already registered (i.e. stored in a memory of the base station 10) as the aggregatable carrier, then this secondary carrier sector can be utilized 830. Otherwise, it is checked 840 whether the difference between the highest power and the next highest power is above the second threshold value. If, or when, the difference between the highest power and the next highest power is above the second threshold value the secondary carrier sector having the highest power can be registered 850 as an aggregatable carrier sector. It is also checked 860 whether this secondary carrier sector having the highest power is available. If it is available as the aggregatable carrier, then this secondary carrier sector is utilized 830. Otherwise, the base station 10 can trigger the usage 870 of all secondary carrier sectors for carrier aggregation.

Figure 9:
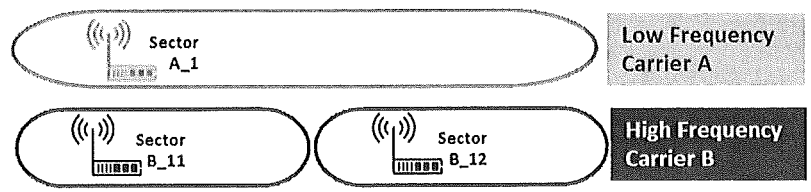
FIG. 9 shows an example scenario where one radio sector uses a first (lower) frequency carrier and two radio sectors use a second (higher) frequency carrier.

Alternative 4—Multiple Aggregatable Carriers Detection:

FIG. 9 illustrates three radio sectors, where radio sector $A\_1$ uses a comparatively lower frequency and where radio sectors $B\_11$ and $B\_12$ use a comparatively higher frequency. A radio cell operating at lower frequency usually has a larger coverage than a radio cell operating at a comparatively higher frequency. It could happen that one lower frequency cell coexists with more than one high frequency cell as is schematically shown in FIG. 9, where both radio sector $B\_11$ and $B\_12$ are covering the same area as Sector $A\_1$. In this scenario, both radio sector $B\_11$ and radio sector $B\_12$ could be aggregatable carriers of Sector $A\_1$. In order to support the cases mentioned earlier in this disclosure, the IFHO mentioned in alternatives 2, 3, and 4 hereinabove could advantageously be triggered more frequently, e.g. in order to check if multiple aggregatable sectors are present. For instance, such check could be triggering by a timer or timer functionality of the base station 10.

In the above-mentioned alternative 2, the base station 10 could periodically trigger the IFHO to the secondary carrier (Carrier B) to check if there are further sector carriers to be aggregated. If another sector carrier was better than the registered aggregatable carrier, the base station could add this new sector carrier as another aggregatable carrier instead of replacing it with the already registered one. This allows the base station 10 to remove faulty registered aggregatable carriers or deal with configuration changes in the radio cell.

Alternatively, radio cell A and radio cell B can exchange information related to the quality of communications in respective carriers. If the quality in the secondary carrier degrades above a certain threshold, for example the BLER (Block Error Rate) of the aggregated secondary carrier, Cell A (or Cell B) can refresh the mapping of primary carrier sector to the secondary carrier sector and repeat the procedure in alternative 2.

The various embodiments described herein may provide several advantages. By ordering, or requesting, at least one selected UE to perform an IFHO from the primary carrier (e.g. Carrier A) to a secondary carrier (e.g. Carrier B) it is made possible to evaluate which one of multiple secondary radio sectors is the best available, or most suitable, secondary radio sector. More particularly, by moving the UE to another carrier (i.e. the secondary carrier), it is made possible for the base station to evaluate powers of the different secondary radio sectors. Once evaluated, the base station can select, or otherwise determine, which one of the secondary radio sectors should be used by the UE as its secondary radio sector. The proposed embodiments may thus allow for a more dynamic selection of radio sector to be used by a UE as a secondary radio sector. The more dynamic selection of radio sector thus also provides an alternative, and improved, way of selecting radio sector to be used by a UE.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the present invention has been described above with reference to specific embodiments, it is not intended to be limited to the specific form set forth herein. For example, while the various embodiments have been described mainly with respect to LTE, it will come to mind to one skilled in the art having benefit of the teachings presented in the foregoing description and associated drawings that the embodiments presented herein can equally possible be used in other 3GPP standards or other wireless technologies. Consequently, the invention is limited only by the accompanying claims and other embodiments than the specific above are equally possible within the scope of the appended claims. Also, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method performed by a base station for selecting a secondary carrier sector of a second radio cell to be used by a user equipment when employing carrier aggregation, wherein the base station is serving a first radio cell as well as a second radio cell, which second radio cell is at least partially overlapping the first radio cell, and wherein the base station is controlling multiple radio units each of which is serving a respective primary carrier sector of the first radio cell and wherein the base station is also controlling multiple radio units each of which is serving a respective secondary carrier sector of the second radio cell, the method comprising:
   collecting information related to powers of all primary carrier sectors;
   based thereon comparing the powers of all primary carrier sectors and determining which one of the primary carrier sectors has the highest power and which one of the primary carrier sectors has the next highest power;
   comparing the highest power with a first threshold value;
   comparing a difference between the highest power and the next highest power with a second threshold value;
   responsive to the highest power being above the first threshold as well as the difference between the highest power and the next highest power being above the second threshold value ordering at least one selected user equipment to perform a Inter-Frequency Handover from a primary carrier sector to a secondary carrier sector; in response thereto
   collecting information related to powers of all secondary carrier sectors of the second radio cell;
   based thereon comparing the powers of all secondary carrier sectors and determining which one of the secondary carrier sectors has the highest power; and
   selecting the secondary carrier sector with the highest power to become the secondary carrier sector to be used.

2. The method according to claim 1, wherein the method additionally comprises:
   determining which one of the secondary carrier sectors has the next highest power;
   comparing, with a third threshold value, the highest power of the secondary carrier sectors;
   comparing, with a fourth threshold value, a difference between the highest power of the secondary carrier sectors and the next highest power of the secondary carrier sectors; and
   responsive to the highest power of the secondary carrier sectors being above said third threshold as well as the difference between the highest power and the next highest power of the secondary carrier sectors being above said fourth threshold value selecting the secondary carrier sector with the highest power to become the secondary carrier sector to be used.

3. The method according to claim 2, wherein the first and the third threshold values are the same threshold value.

4. The method according to claim 2, wherein the second and the fourth threshold values are the same threshold value.

5. The method according to claim 1, further comprising:
checking whether the secondary carrier sector with the highest power is already registered by the base station to be the secondary carrier sector to be used; and
selecting the secondary carrier sector with the highest power to be the secondary carrier sector to be used only in response to the secondary carrier sector with the highest power also being registered by the base station to be the secondary carrier sector to be used.

6. A base station for selecting a secondary carrier sector of a second radio cell to be used by a user equipment when employing carrier aggregation, wherein the base station is configured to serve a first radio cell as well as a second radio cell, which second radio cell is at least partially overlapping the first radio cell, and wherein the base station is configured to control multiple radio units each of which is configured to serve a respective primary carrier sector of the first radio cell and wherein the base station is also configured to control multiple radio units each of which is configured to serve a respective secondary carrier sector of the second radio cell, the base station comprising:
a communication interface for wireless communication with the multiple radio units and for communication with at least one user equipment;
a processor; and
a memory storing computer program code which, when run in the processor, causes the base station to: collect information related to powers of all primary carrier sectors; based thereon compare the powers of all primary carrier sectors and determining which one of the primary carrier sectors has the highest power and which one of the primary carrier sectors has the next highest power; compare the highest power with a first threshold value; compare a difference between the highest power and the next highest power with a second threshold value; responsive to the highest power being above the first threshold as well as the difference between the highest power and the next highest power being above the second threshold value order one or more selected user equipments to perform a Inter-Frequency Handover from a primary carrier sector to a secondary carrier sector; in response thereto collect information related to powers of all secondary carrier sectors of the second radio cell; based thereon compare the powers of all secondary carrier sectors and determining which one of the secondary carrier sectors has the highest power; and select the secondary carrier sector with the highest power to become the secondary carrier sector to be used.

7. The base station according to claim 6, wherein the memory stores computer program code, which, when run in the processor causes the base station to determine which one of the secondary carrier sectors has the next highest power; compare, with a third threshold value, the highest power of the secondary carrier sectors; compare, with a fourth threshold value, a difference between the highest power of the secondary carrier sectors and the next highest power of the secondary carrier sectors; and responsive to the highest power of the secondary carrier sectors being above said third threshold as well as the difference between the highest power and the next highest power of the secondary carrier sectors being above said fourth threshold value select the secondary carrier sector with the highest power to become the secondary carrier sector to be used.

8. The base station according to claim 7, wherein the first and the third threshold values are the same threshold value.

9. The base station according to claim 7, wherein the second and the fourth threshold values are the same threshold value.

10. The base station according to claim 6, wherein the memory stores computer program code, which, when run in the processor causes the base station to check whether the secondary carrier sector with the highest power is already registered by the base station to be the secondary carrier sector to be used; and select the secondary carrier sector with the highest power to be the secondary carrier sector to be used only in response to the secondary carrier sector with the highest power also being registered by the base station to be the secondary carrier sector to be used.

11. The base station according to claim 6, wherein the base station is an evolved NodeB.

\* \* \* \* \*

UNITED STATES PATENT AND TRADEMARK OFFICE
CERTIFICATE OF CORRECTION

Page 1 of 1

PATENT NO. : 9,294,975 B2
APPLICATION NO. : 14/334980
DATED : March 22, 2016
INVENTOR(S) : Belleschi et al.

It is certified that error appears in the above-identified patent and that said Letters Patent is hereby corrected as shown below:

In the Drawings

In Fig. 4, Sheet 4 of 9, for Tag "170", in Line 1, delete "which which" and insert -- which --, therefor.

In the Specification

In Column 2, Line 50, delete "compability" and insert -- compatibility --, therefor.

In Column 4, Line 64, delete "sector)" and insert -- sector). --, therefor.

In Column 7, Line 66, delete "may me" and insert -- may be --, therefor.

In Column 11, Line 43, delete "a IFHO" and insert -- an IFHO --, therefor.

In Column 12, Line 10, delete "a IFHO" and insert -- an IFHO --, therefor.

Signed and Sealed this
Sixteenth Day of August, 2016

Michelle K. Lee
*Director of the United States Patent and Trademark Office*